May 15, 1934.  E. R. BURTNETT  1,958,607
CHANGE SPEED TRANSMISSION GEAR
Filed Oct. 25, 1930
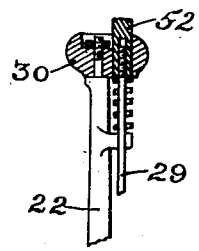
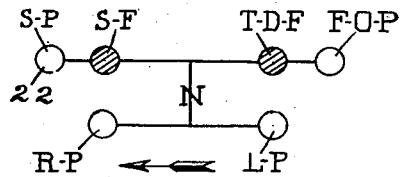
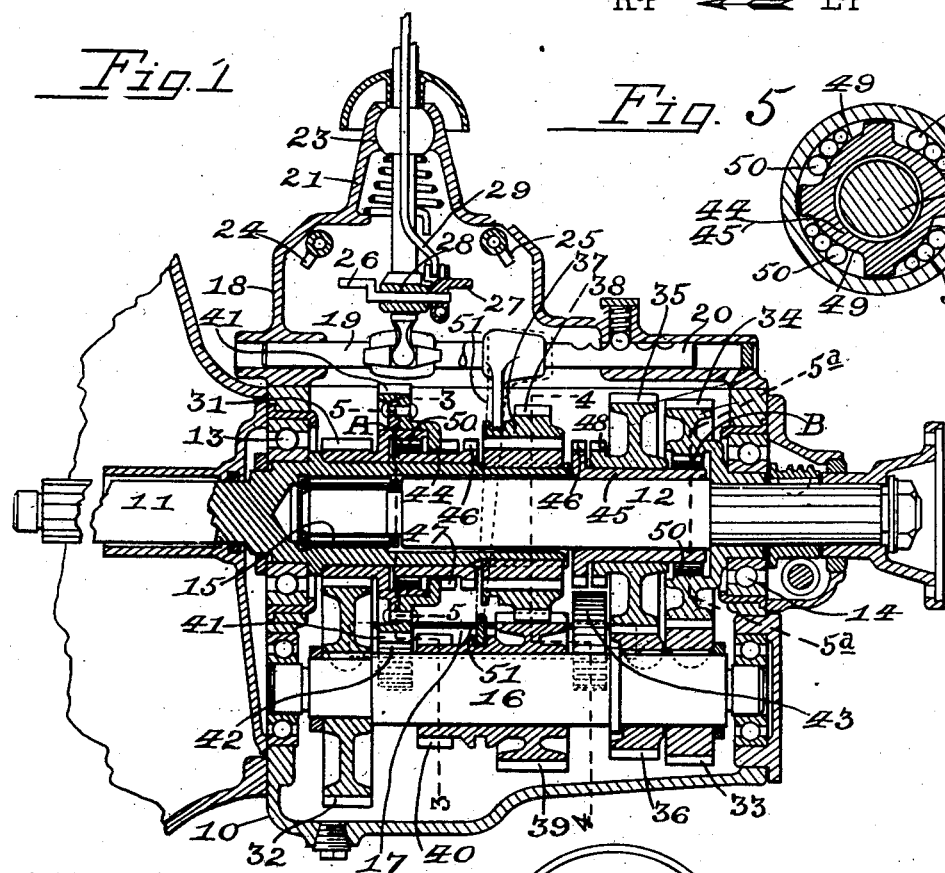
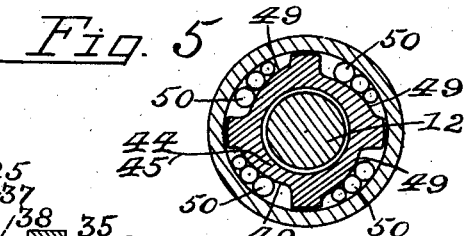
INVENTOR.
Everett R. Burtnett Patented May 15, 1934

1,958,607

UNITED STATES PATENT OFFICE 1,958,607

CHANGE SPEED TRANSMISSION GEAR

Everett R. Burtnett San Marino, Calif., assignor of one-half to Edith Glynn Burtnett, Los Angeles, Calif.

Application October 25, 1930, Serial No. 491,212

REISSUED

16 Claims. (Cl. 74—57)

My invention relates to change speed transmissions for motor vehicles and more particularly to the type having single power input shafts adapted to cooperate with single acting power clutches and among the principal objects of my invention are, the provision of a change speed transmission gear, wherein a silent underdrive second, direct drive third and an overdrive fourth speed can be accomplished alternately by two way movement of the shift lever in a single motion plane, enabling the operator to get into the three gears, namely, silent underdrive second (optionally under conditions effecting free-wheeling or positive gearing drive), silent direct drive third under conditions effecting free-wheeling and overdrive fourth speed (under positive gearing conditions), without transverse movement of the shift lever, thus providing easier shifting ability for starting and range drive three speeds. For the obtaining of a motor vehicle transmission with which it is possible to start the vehicle with the shift lever to the right and forward (optionally in free-wheeling or positive gearing second gear). To bring the shift lever straight back to change to free-wheeling third (direct drive) for traffic driving or conditions favorably negotiated with a comparatively low ratio high speed gear. And to continue the movement of the shift lever straight back, to an extreme right side rearward position, to accomplish a positive gearing overdrive.

A further object of my invention is to provide a change speed transmission for motor vehicles, wherein a positive gearing silent second speed drive is made optional for braking purposes with a free-wheeling drive second speed by continued movement of the shift lever in a given direction and wherein a positive gearing silent overdrive speed, of slightly higher gear than the direct drive free-wheeling third speed, is made optional with a free-wheeling direct drive third speed for braking purposes and for operation of the vehicle at high speed with a reduction of engine speed comparatively with the direct drive third speed.

Further objects of my invention are, to provide a novel selective spur gearing for low and reverse speeds, embodying a common driving spur gear carried on a positive clutch member; a common driven spur gear carried on the driving gear element of the underdrive silent second speed gearing; and low and reverse gears, each adapted to coact as a primary speed reduction input to the silent second speed gearing. To obtain an improved selective mating arrangement and disposition of spur gear elements in combination with the constant meshing gear trains for second underdrive and fourth overdrive speeds. Affording a better balance of torque transmission in a four speed gearset for operation with single acting power clutches. And having superlative performance features, including three silent speeds and free-wheeling, and the transmission being of comparatively short, compact, rugged, simple and inexpensive design.

With the foregoing and other objects in view, my invention consists in certain novel features of construction and arrangement of parts that will hereinafter be more fully described and claimed and illustrated in the accompanying drawing, in which:

Fig. 1 is a vertical longitudinal section taken through the center of my improved change speed transmission gear.

Fig. 2 is a diagram illustrating the shift lever movement plan.

Fig. 3 is a diagrammatic view of certain of the spur gears taken on line 3—3 of Fig. 1.

Fig. 4 is a diagrammatic view of certain other spur gears taken on line 4—4 of Fig. 1.

Fig. 5 is a cross section of the ratchet roller clutch by which the free-wheeling is obtained, and is taken on lines 5—5 and 5a—5a of Fig. 1.

Referring by numerals to the accompanying drawing 10 designates a gearset case in the ends of which axially aligned driving and driven shaft members 11 and 12 are journaled respectively in bearings 13 and 14, the driven shaft member 12 being pilot journaled in the driving shaft member 11 by means of a bearing 15.

A countershaft 16 is arranged in parallel alignment with said driving and driven shaft members 11 and 12 and rotatably journaled in bearings in the ends of the case 10, and a second countershaft 17 is arranged in parallel alignment with the first countershaft 16.

A case cover 18, in which two sliding bars 19 and 20 are arranged in parallel alignment and supporting a tower 21, is removably secured to the top of the case 10. A shift lever 22 is fulcrumed at the bearing 23 in the tower 21 of the case cover 18. Two rotatably adjustable stop members 24 and 25 are fixed in the case cover 18 in the travel path of cranks 26 and 27 respectively commonly mounted for rotation in a bearing 28 carried on the shift lever 22, and a rod 29, connecting at the lower end with the element of cranks 26 and 27 and extending operable at the other end through the shift lever ball 30, is provided as a means preventing positive gearing in underdrive second speed and the overdrive fourth speed being accomplished without intent.

A second speed (underdrive) train is provided comprising a driving gear 31 rotatably mounted on the driving shaft 11, a driven gear 32 mounted for relative rotation with a pinion 33 on the countershaft 16 and in constant mesh with said driving gear 31, and a driven gear 34 mounted for relative rotation on the driven shaft 12 and in constant mesh with said pinion 33.

A fourth speed (overdrive) is provided and made up of a driving gear member 35 rotatably mounted on the driven shaft 12 and a driven gear member 36 mounted for relative rotation with the pinion 33 on the countershaft 16 and in constant mesh with said driving gear 35, the gears 35 and 36 coacting with the gears 33 and 34 to overdrive the driven shaft 12.

A positive clutch 37 carrying a spur driving gear 38 for relative rotation therewith is mounted for relative rotation on the driving shaft 11. A cluster spur gearing element comprising a driven spur gear 39 in constant mesh with the driving gear 38 carried on the clutch 37 and a spur pinion gear 40 is rotatably mounted for axial movement on the countershaft 16. A common low and reverse speed driven spur gear 41 is fixedly connected for relative rotation to the driving gear member 31 of the second (underspeed) gearing, and a reverse idler drive train is made up of a driving spur gear 42 in constant mesh with the common driven spur gear 41 and a driven spur gear 43 mounted for relative rotation with gear 42 on the second countershaft 17.

The cluster gear element comprising gears 39 and 40 is adapted to be axially moved on the countershaft 16 to bring the pinion gear 40 into mesh with the common driven gear 41 to effect low speed, and in the opposite direction to bring the driven gear 39 into mesh with the reverse idler driven gear 43 to effect a reverse speed drive to the common driven gear 41 through the reverse idler driving gear 42 in constant mesh with the common driven gear 41.

Two one-way roller ratchet clutches A and B are combined in the gearset, one cooperating with the second speed gearing to effect free-wheeling in the respective speed, the other cooperating with the driven shaft to effect free-wheeling in the direct drive (third speed). Both one-way ratchet clutches are rendered separately operable and as driven elements with the positive clutch 37 respectively by means of two driving sleeves 44 and 45 respectively rotatably mounted on the driving and driven shafts 11 and 12, the sleeve member 45 for the direct drive couple being concentrically operatively interposed between the driven shaft 12 and the fourth speed overdrive driving gear member 35.

Positive clutch jaws 46 are provided on the ends of both sleeve members 44 and 45 in contiguous position with the positive clutch 37, positive clutch jaws 47 are provided on a part of the connected gears 31 and 41 for rendering the free-wheeling clutch A of the second speed gearing inoperative for braking purposes in second speed, and positive clutch jaws 48 are provided on the overdrive fourth speed driving gear member 35 for rendering the free-wheeling one-way clutch B inoperative to supplant the free-wheeling third speed direct drive of the one-way clutch B with an overdrive fourth speed either for braking purposes, as a near ratio positive gear alternative with free-wheeling, for braking purposes or for speed, for it is obvious, since the overdrive gearing acts to drive the driven shaft 12 at greater speed than the driving shaft 11 carrying the positive clutch 37, from which latter member the direct drive third speed free-wheeling clutch B is driven, that the engagement of the positive clutch with both the clutch jaws 46 on the sleeve 45 and the clutch jaws 48 on the overdrive driving gear member 35 will cause the driven shaft 12 to be overdriven by the gear members 35, 36, 33 and 34 and to overrun the sleeve member 45 through the medium of the ratchet elements of the one-way clutch B.

Cams 49, (see Fig. 5) are provided on the ends of both sleeve members 44 and 45, which ends are coincident with the respective one-way clutches A and B, and rollers 50 are operatively arranged respectively of ratchet clutch A between the associate driving sleeve 44 and a concentric internal race formed on the driving gear member 31 of the second speed gearing, and of ratchet clutch B between the associate driving sleeve 45 and a concentric internal race preferably formed on the driven gear member 34 which is mounted for relative rotation with the driven shaft 12.

The operation is as follows:

Referring to the shift lever movement diagram Fig. 2, to get into free-wheeling second speed the shift lever 22 is moved from the neutral position N to the right and forward to S—F, by which action the positive clutch 37 is brought into positive clutch engagement with the clutch jaws 46 on the sleeve 44, thereby transmitting the rotary motion from the driving shaft 11, through the sleeve 44 rotatably mounted thereon, by means of cams 49 through the rollers 50 to the driving gear member 31, effecting a free-wheeling second speed drive through gears 31, 32, the countershaft 16 and gears 33 and 34 to the driven shaft 12. The continued movement of the shift lever 22 on the right side forward to S—P renders the free-wheeling one-way drive of second speed inoperative by bringing the positive clutch 37 into positive couple with the clutch jaws 47 on the second speed gearing driving gear member 31, thereby locking the said driving gear member for relative rotation two ways with the driving shaft 11.

The movement of the shift lever 22 straight rearward on the right side to T—D—F takes the positive clutch 37 out of clutch couple with the second speed gearing driving elements and brings it into clutch couple with the clutch jaws 46 on the sleeve 45, effecting a direct drive third speed free-wheeling couple between the driving shaft 11 and the driven shaft 12, through the medium of the positive clutch 37, the sleeve 45 rotatably mounted on the driving shaft 12, the ratchet rollers 50 of the one-way clutch B and through the body of the driven gear member 34 to the driven shaft 12. Continued movement of the shift lever 22 on the right side rearward to F—O—P brings the positive clutch 37 into clutch couple with the clutch jaws 48 on the fourth speed overdrive gearing driving gear member 35, thereby rendering the direct drive third free-wheeling speed inoperative, by virtue of the rotary motion being transmitted from the positive clutch 37 through the overdrive gearing members 35, 36, 33 and 34 to the driven shaft 12, causing the driven shaft 12 to over-run the sleeve 45, which is coupled with the positive clutch 37 through the medium of the rollers 50 of the one-way clutch B.

Thus it will be seen that with my improved change speed transmission for single acting power clutches, the shifting ability of the single shiftable positive clutch member 37 is extended to involve three silent speeds, namely, second (underdrive), third (direct) and fourth (overdrive), with free-wheeling combined and available in second speed, with positive gearing second speed optional, and free-wheeling available in third speed (direct drive), with positive gearing of substantially the same ratio, as the direct drive high speed, optional and available with the direct drive (third speed) through the medium of the overdrive fourth speed. Providing three relatively next-in-ratio silent forward speeds, with free-wheeling optional in two of the three speeds, and an alternate positive gearing, to the free wheeling third speed available as a fourth speed, and all under the control and two way movement of one shifting element, requiring no transverse movement of the shift lever to control the three speeds, either free wheeling or positive.

Moving the shift lever forward to the center then to the left and rearward to L—P brings the positive clutch 37 to a neutral position and axially moves the cluster gear element made up of spur gears 39 and 40 forward on the countershaft 16, bringing the pinion 40 into mesh with the common driven spur gear 41, resulting in the rotary motion of the driving shaft 11 being transmitted through the body of the positive clutch 37, through the constant mesh mating gears 38 and 39, the pinion 40 and mating gear 41 to the driving gear member 31 of the second speed constant mesh gearing and thereafter through the gears 31, 32, the countershaft 16 and gears 33 and 34 to the driven shaft 12, providing first (low) forward speed (positive gearing).

Moving the shift lever 22 straight forward on the left side to R—P oppositely moves the cluster gear element comprising gears 39 and 40 rearward on the countershaft 16, by means of the shifting arm cooperative with the cluster gear element, bringing the gear 39 into mesh with the reverse idler driven gear 43, resulting in the rotary motion from the driving shaft 11 being transmitted through positive clutch 37, through the gear 38 to gear 39, thence to the reverse idler gear 43, the second countershaft 17, through constant meshing reverse idler driving gear 42 and the common driven gear 41 to the driving gear member 31 of the second speed gearing and thereafter through gears 31, 32, the countershaft 16 and gears 33 and 34 to the driven shaft 12, providing reverse (low) speed (positive gearing).

With the positive clutch 37 in engagement with the clutch jaws 46 respectively of either sleeve 44 or 45 for free-wheeling second or direct drive third speeds, the alternate positive gearing drive of the respective speed is accomplished by pressing the plunger 52 in the shift lever ball 30, causing the rod 29 to turn the cranks 26 and 27 down whereof they will pass the stops 24 and 25, permitting the shift lever being moved further in a given direction and effecting additional axial movement to the positive clutch member 37, bringing it into direct positive couple with the driven member of the respective one-way clutch.

Thus it will be seen that I have provided an improved four forward speed transmission of easier shifting ability, providing silent second (underdrive), silent high (third speed direct), silent fourth (overdrive) and low and reverse speeds, all accomplished by standard shift lever motion in two planes parallel with the axis of the vehicle, the range as required with conventional standard three speed gearsets.

It will be understood that minor changes in the size, form and construction of the various parts of my improved change speed transmission gear may be made and substituted for those herein shown and described without departing from the spirit of my invention, the scope of which is set forth in the appended claims.

I claim as my invention:

1. In drive coupling means for changing speeds, the combination with component coaxial driving and driven shafts of a mechanism adapted to transmit power, of a positive clutch rotatable with the driving shaft for connecting alternative intermediary drives coacting with the driven shaft to the said driving shaft, an overrunning clutch coacting with said driven shaft for directly driving said shaft one way, means arranged and adapted to be first engaged by the said positive clutch from a neutral position for operatively connecting said overrunning clutch to said driving shaft, a gearing coacting with the driven shaft for overdriving said shaft, the primary driving member of said gearing being arranged and adapted to be secondarily engaged by the said positive clutch for operatively connecting said gearing to said driving shaft, means to shift said positive clutch to connect the said means to be engaged, for driving the one way clutch, to the driving shaft, and to shift said positive clutch to connect the said primary driving member of the said gearing to the driving shaft whereby the driven shaft may be driven at greater speed than the driving shaft.

2. With a driving shaft and a driven shaft in axial alignment therewith, two intermediary driving elements for optional use between said driving and driven shafts, one in the form of a one way clutch coacting with the driven shaft, and the other in the form of an overdrive gearing coacting with said driven shaft, the one way clutch and the overdrive gearing each having a member to be directly coupled with the driving shaft, the said member to be coupled of the one way clutch being arranged whereby it may be primarily coupled and said member to be coupled of the overdrive gearing being arranged, relatively with the member to be coupled of the one way clutch, whereby it will be secondarily coupled, a shiftable coupling member rotatable with the driving shaft, means to shift said coupling member to couple the member to be coupled of the one way clutch to the driving shaft for direct drive under conditions permitting the driven elements to overrun the driving elements thereof, and means to shift said coupling member to couple the member to be coupled of the said gearing intermediary drive to the driving shaft for overdriving the driven shaft under conditions enabling the member to be clutched of the one way clutch intermediary drive to be retained in intercouple relation with the driving shaft.

3. A motor vehicle selective one-way direct drive or two-way overdrive gear drive comprising, two aligned transmission shafts; a one-way direct drive intermediary transmission comprising a sleeve rotatably mounted on one of said shafts, a driven member mounted non-rotatable on the same shaft and instrumentalities between said sleeve and driven member operating to one-way drive connect said sleeve and driven members; an overdrive gear intermediary transmission comprising a gear rotatably mounted on said sleeve and means cooperating with said gear and operating to drive said driven member of said one-way direct drive intermediary transmission at increased speed relative to said gear; a longitudinally shiftable positive clutch mounted nonrotatable but axially movable on the one of said two shafts other than the shaft carrying said sleeve and gears, clutch teeth on said clutch, clutch teeth on both said sleeve and said gear which is rotatably mounted on said sleeve, the clutch teeth respectively on said sleeve and said gear being positioned relatively whereby those of said sleeve may be first engaged, and those on said gear thereafter engaged, by the clutch teeth on said positive clutch by longitudinal movement of said clutch in one direction, and means to shift said positive clutch progressively into positive engagement respectively with said sleeve and said clutch toothed gear.

4. In a transmisison, two aligned shafts, a driven gear fixed on one of said shafts, a sleeve rotatably mounted on said shaft carrying said gear, instrumentalities between said sleeve and gear operating to one-way drive said gear, a drive gear rotatably mounted on said sleeve, means for driving said driven gear from said drive gear at increased speed relative to said drive gear, and means to, first, drive connect said sleeve and the one shaft other than said shaft carrying said sleeve and gears, and optionally thereafter, to drive connect said drive gear and said one shaft other than said shaft carrying said sleeve and gears.

5. In a transmission, a drive shaft, a driven shaft, an intermediary transmission sleeve rotatably mounted on one of said shafts, means for driving said one shaft from said sleeve in one direction and permitting over-run of said shaft in the same direction under momentum of the latter, a drive gear member rotatably mounted on said sleeve, means for driving said one shaft from said drive gear at increased speed relative to said drive gear member, and means operable under progressive shifting, first, to drive connect said sleeve and the other of said shafts, and optionally thereafter, to drive connect said drive gear member and said other shaft.

6. In a transmission, two aligned transmission members, a sleeve rotatably mounted on one of said transmission members, means one-way drive connecting the sleeve carrying transmission member to said sleeve, a gear rotatable with the sleeve carrying transmission member, a gear rotatably mounted on said sleeve, and means for connecting, first, said sleeve and the other of said transmission members, and optionally thereafter, said gear which is rotatably mounted on said sleeve and said other transmission member.

7. In transmission mechanism, aligned drive and driven shafts, a bell shaped member coaxial and to turn with one of said shafts, a sleeve in encircling and rotatable relative relation to the same said shaft with which said bell shaped member turns, cams on said sleeve, roller clutch members engaging said cams and said bell shaped member for one-way drive connecting said sleeve and bell, a drive gear rotatably mounted on said sleeve and in constant overdrive gearing connection with said shaft to which said sleeve is in encircling relation, clutch jaws on said sleeve and said gear, and a positive clutch to turn with the other of said shafts and engageable progressively first with the clutch jaws on said sleeve and thereafter with the clutch jaws on said gear.

8. In transmission mechanism, the combination of aligned drive and driven shafts, means for establishing a one-way direct drive between said shafts including an overrunning clutch operating to one-way drive one of said shafts and a positive clutch to turn with the other one of said shafts and being shiftable into and out of a position in which said overrunning clutch is connected to be driven from said shaft with which said positive clutch turns, and means for supplanting said one-way direct drive between said shafts with an increased speed effecting gear drive including gearing, the drive element of which is engageable by said positive clutch to establish said gear drive as an operating transmission medium between said shafts, and the driven element of which operates to drive the overrunning clutch driven one of said shafts.

9. In transmission mechanism, aligned drive and driven members, a sleeve rotatably mounted on one of said members, a one-way clutch actuated by said sleeve and operating to drive said driven member, a gear in encircling and rotatable relative relation to said sleeve, gearing effective to overdrive between said gear and driven member connecting said gear and driven member, and means shiftable in one direction to progressively couple said sleeve and gear to turn with said drive member including a clutch to turn with said drive member and adapted by movement in a given direction to engage, first the said sleeve, and thereafter, with further movement in the same direction, to also engage said gear.

10. In transmission mechanism, aligned main transmission drive and driven shafts, a sleeve in encircling and rotatable relative relation to one of said drive and driven shafts, an overrunning clutch operatively connecting said sleeve and the one of said drive and driven shafts to which said sleeve is in encircling relation, a gear in encircling and rotatable relative relation to said sleeve, a pair of coaxial gears axially out-of-line but parallel to said main drive and driven shafts, said pair of gears to turn together, one of said gears meshing with said gear which is in encircling relation to said sleeve, a gear to turn with the one of said main transmission drive and driven shafts to which said sleeve is in encircling relation, the other of said pair of coaxial gears being in constant mesh with said gear to turn with said one of said main transmission drive and driven shafts, and means including a clutch to turn with the other one of said main drive and driven shafts, than is encircled by said sleeve, for connecting either, said sleeve, or said gear which is in encircling relation to said sleeve, to turn with said main shaft with which said last mentioned clutch turns.

11. In a power transmitting mechanism, power transmitting members including members giving two driving ratios between two of the members, one of said driving ratios being a direct drive between said two members, a clutch element for selectively completing the driving connections of either of said driving ratios, and means cooperating with said power transmitting members whereby the driving connections for one of said driving ratios is maintained while the driving connections of the other of said driving ratios is effected.

12. In a power transmitting mechanism, power transmitting members including members giving two driving ratios between two of the members, one of said driving ratios being a direct drive between said two members, said two members rotatably mounted in axial alignment, a clutch member for successively completing the driving connections of said driving ratios in one direction of movement, and means cooperating with said power transmitting members whereby the driving connections for one of said driving ratios is maintained while the driving connections of the other of said driving ratios is effected.

13. In a power transmitting mechanism, driving and driven members, gearing for giving one ratio of drive between said members, means for directly connecting said members to give another ratio of drive therebetween, said means including a sliding clutch member for selectively completing the driving connections of either of said ratios, and a cooperating clutch whereby the driving connections for one of the said ratios is maintained while completing the driving connections of the other ratio.

14. In a power transmitting mechanism, driving and driven members rotatably mounted in axial alignment, gearing for giving one ratio of drive between said members, means for directly connecting said members to give another ratio of drive between said members, said means including a clutch member for selectively completing the driving connections of either of said ratios, and an over-running clutch disposed in the driving connections of one of the said ratios whereby the driving connections of one of the said ratios is maintained while the driving connections of the other ratio is effected.

15. In a power transmitting mechanism, driving and driven members rotatably mounted in axial alignment, gearing for giving one ratio of drive between said members, means for directly connecting said members to give another ratio of drive, a clutch member of said means for successively completing the driving connections of said ratios in one direction of movement, and an over-running clutch cooperating with said gearing whereby upon directly connecting said driving and driven members, the driving connection through said gearing is maintained.

16. In a power transmitting mechanism, aligned shafts, gearing for connecting said shafts, a member carried in rotation with and slidable on one of said shafts to selectively effect a driving connection with said gearing or with the other of said shafts, and an over-running clutch cooperating with said shafts and gearing whereby one driving connection of said member is maintained upon effecting the other driving connection.

EVERETT R. BURTNETT.